UNITED STATES PATENT OFFICE.

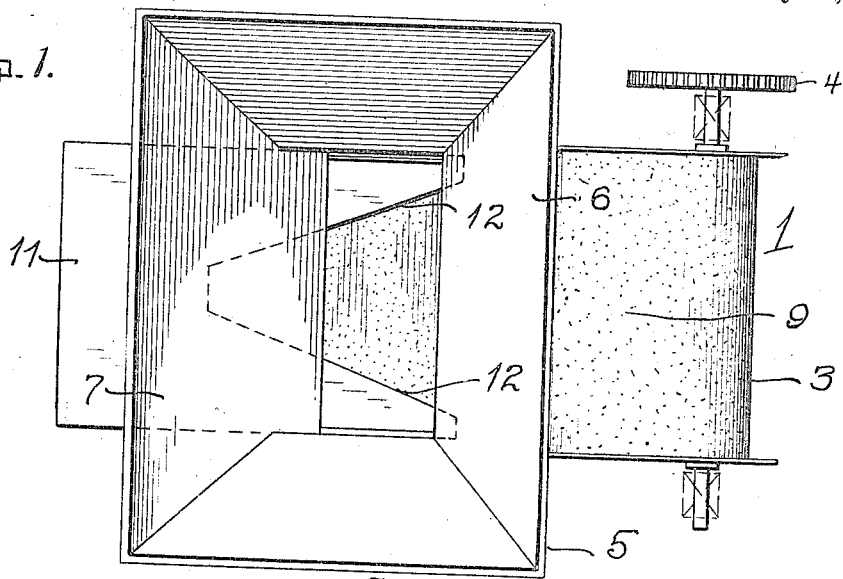
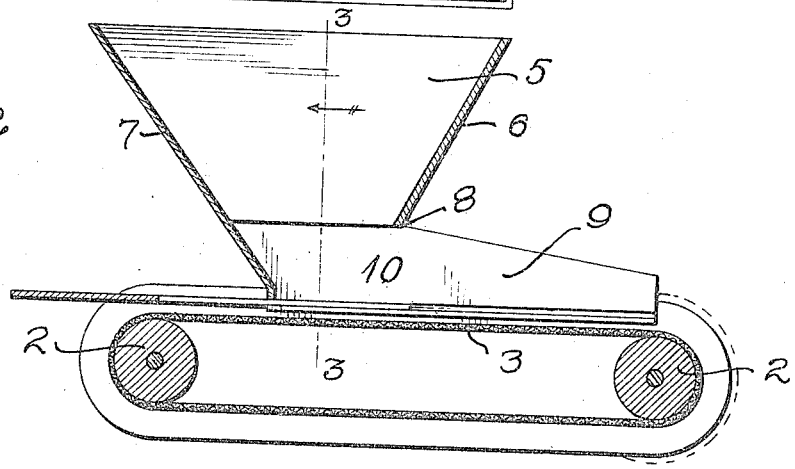
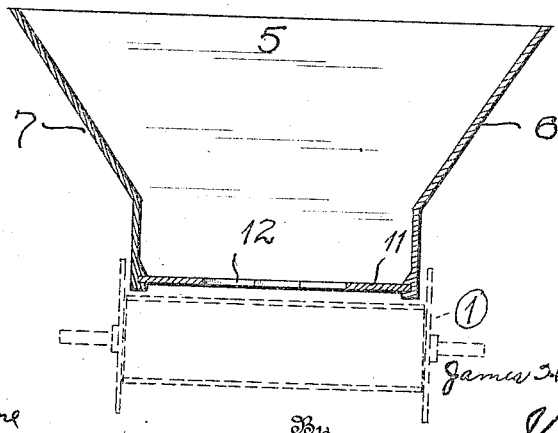

JAMES HOWARD DICKERSON, OF FAIRMONT, WEST VIRGINIA, ASSIGNOR TO FAIRMONT MINING MACHINERY COMPANY, A CORPORATION OF WEST VIRGINIA.

FEED-REGULATOR.

1,234,532.            Specification of Letters Patent.      Patented July 24, 1917.

Application filed January 15, 1916. Serial No. 72,322.

*To all whom it may concern:*

Be it known that I, JAMES HOWARD DICKERSON, a citizen of the United States, residing at Fairmont, in the county of Marion and State of West Virginia, have invented certain new and useful Improvements in Feed-Regulators, of which the following is a specification.

This invention broadly relates to a device for regulating or controlling the discharge of material from a feed hopper or the like, it being, however, especially designed and preferably adapted for use in connection with apron feeders, such as are employed for feeding coal to an apron conveyer. As heretofore practised, feeders of this type are not capable of regulating the discharge of coal except by varying the speed of the apron conveyer. Furthermore, when coal is to be spread on a picking table or pan conveyer, it is necessary to use a short feeder for discharging the coal from the receiving hopper in order to spread it in a thin layer on the picking table.

With disadvantages of this nature to overcome, it is the primary object of the present invention to eliminate the short feeder and allow the conveyer to draw the coal from the receiving hopper in a practical and efficient manner.

A further object of the invention is to construct the device in a manner to render it adjustable, whereby it may control the discharge of coal, or even cut off the discharge, by covering a portion of or all of the discharge opening in the receiving hopper.

The details of construction set forth in the drawing are selected for purposes of illustration, and while in themselves embracing some of the minor features of the invention, they are not to be taken as limiting the scope of the invention.

In said drawing:—

Figure 1 is a top plan view of an apron conveyer and a receiving hopper showing the application of the invention.

Fig. 2, a longitudinal sectional view;

Fig. 3 is a cross on line 3—3 of Fig. 2.

Referring to the drawings in detail, 1 represents the conveyer which may be of a conventional type having the usual rollers 2, over which the apron 3 travels, and the necessary driving gear 4. 5 represents the receiving hopper, which, according to the present invention is constructed with the receiving end having outwardly flaring side walls 6 and 7, one of them, namely, the wall 7 being flared approximately from the base of the hopper to the receiving end thereof, whereas the outwardly flaring wall 6 terminates, as shown at 8, at a point above the base of the hopper from which point there extends a longitudinally disposed discharge 9. This discharge extends longitudinally of the conveyer in the direction of travel thereof. This downwardly tapering and longitudinal extension of the hopper provides an elongated discharge opening 10 through which the coal or other material is discharged on the apron conveyer in a substantially thin layer, that is to say, by means of the elongated discharge opening the coal may be spread over a greater surface of the apron of the conveyer and in order to control the discharge of coal through this opening a veil plate 11 is slidably mounted in the mouth or discharge opening of the hopper and is so arranged and associated with the hopper that it may be actuated and slid longitudinally of the conveyer to open and close successive portions of the discharge opening of the hopper by means of the V-shaped opening 12 provided therein, control the discharge of coal by restricting or enlarging the discharge opening and allow either a greater or less amount of coal or other material to be drawn from the receiving hopper on the apron of the conveyer. The particular construction of this veil plate and its coöperation and association with the receiving hopper and the conveyer forms the preferred embodiment of the invention. With means for varying at will the exposed area of the apron upon which the coal may come into contact, the volume of coal delivered per unit of time may be accurately determined, without the complication of changing the speed of the apron, and without danger of choking the feed.

I claim:—

1. A feed regulator comprising a hopper with a narrow middle portion and a laterally extended discharge way at its lower end, said discharge way having an opening in its bottom directly below the narrow portion of the hopper, a valve having an opening therein of gradually reduced width controlling the discharge from said bottom opening, and a conveying means located to receive the discharge through said valve.

2. A feed regulator comprising a traveling feed apron, a hopper delivering thereon and spaced vertically above the surface thereof, and thereby providing an unobstructed discharge passage for material delivered by the hopper, and a valve spaced from the discharge portion of the hopper and overlying the apron, there being an opening on one side of the hopper between the valve and the discharge portion of said hopper, said valve having an opening of gradually decreasing width controlling the amount of material deposited upon the apron.

3. A feed regulator comprising a hopper, a laterally extending passageway beneath the hopper and provided with an endless carrier constituting the floor thereof, the passageway having unobstructed communication with the hopper, and means located beneath the hopper and adjacent to the floor of the passageway to proportion the effective surface of the carrier immediately beneath the outlet from the hopper.

The foregoing specification signed at Fairmont, West Virginia, this 23rd day of December, 1915.

JAMES HOWARD DICKERSON.

Copies of this patent may be obtained for five cents each, by addressing the "Commissioner of Patents, Washington, D. C."